United States Patent
Inoue et al.

(10) Patent No.: US 11,999,308 B2
(45) Date of Patent: Jun. 4, 2024

(54) IMPACT ENERGY ABSORBING MEMBER

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Takuma Inoue, Kariya (JP); Shin Terada, Toyota (JP); Kazuyoshi Ogata, Toyota (JP); Masahiko Yasue, Kariya (JP); Kohei Mori, Kariya (JP); Masahiro Nakayama, Kariya (JP); Ryuta Kamiya, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 17/600,365

(22) PCT Filed: Apr. 1, 2020

(86) PCT No.: PCT/JP2020/015063
§ 371 (c)(1),
(2) Date: Sep. 30, 2021

(87) PCT Pub. No.: WO2020/204084
PCT Pub. Date: Oct. 8, 2020

(65) Prior Publication Data
US 2022/0161747 A1    May 26, 2022

(30) Foreign Application Priority Data
Apr. 5, 2019  (JP) ................................. 2019-072963

(51) Int. Cl.
*B60R 19/34*  (2006.01)
*B60R 19/18*  (2006.01)

(52) U.S. Cl.
CPC .............. *B60R 19/34* (2013.01); *B60R 19/18* (2013.01); *B60R 2019/1853* (2013.01)

(58) Field of Classification Search
CPC .. B60R 19/34; B60R 19/18; B60R 2019/1853
See application file for complete search history.

(56) References Cited

U.S. PATENT DOCUMENTS 9,663,147 B2 * 5/2017 Kuriyama ............ B62D 21/152
10,479,301 B2 * 11/2019 Iizuka ..................... B60R 19/24
(Continued)

FOREIGN PATENT DOCUMENTS

JP        10278706 A  * 10/1998
JP     2010-132018 A     6/2010
(Continued)

OTHER PUBLICATIONS

International Search Report for PCT/JP2020/015063 dated May 12, 2020 (PCT/ISA/210).

*Primary Examiner* — Amy R Weisberg
*Assistant Examiner* — Sara Laghlam
(74) *Attorney, Agent, or Firm* — Sughrue Mion, PLLC (57) ABSTRACT

An impact energy absorbing member includes an energy absorbing portion and an attachment portion. The attachment portion is fastened to the bumper reinforcement using a fastener, the fastener extending through the attachment portion and a wall of the bumper reinforcement and including an axis that extends in a direction intersecting an axial direction of the energy absorbing portion. The attachment portion and the energy absorbing portion are in a positional relationship in which the energy absorbing portion does not overlap the fastener when the impact energy absorbing member is viewed in a direction from the bumper reinforcement toward the energy absorbing portion in a vehicle front-rear direction.

2 Claims, 6 Drawing Sheets

(56) References Cited

U.S. PATENT DOCUMENTS

| | | | | |
|---|---|---|---|---|
| 10,926,314 B2* | 2/2021 | Maeda | ................ | B60R 19/023 |
| 2004/0232711 A1* | 11/2004 | Frank | ..................... | B60R 19/24 |
| | | | | 293/155 |
| 2005/0099027 A1* | 5/2005 | Seksaria | ................ | B60R 19/34 |
| | | | | 293/133 |
| 2017/0182960 A1* | 6/2017 | Nakajima | ............... | B60R 19/34 |
| 2018/0170294 A1* | 6/2018 | Hashimoto | ............. | B60R 19/24 |
| 2021/0053519 A1* | 2/2021 | Karlsson | ................ | B60R 19/34 |

FOREIGN PATENT DOCUMENTS

| | | |
|---|---|---|
| JP | 2014-124956 A | 7/2014 |
| JP | 2015-196463 A | 11/2015 |
| JP | 2018-100055 A | 6/2018 |

\* cited by examiner

IMPACT ENERGY ABSORBING MEMBER

TECHNICAL FIELD

The present disclosure relates to an impact energy absorbing member that absorbs impact energy produced when a load is received.

BACKGROUND ART

Automobiles include, for example, a bumper reinforcement at each of the front and rear part of the vehicle body in order to protect the vehicle body and the occupant during a collision. The bumper reinforcement needs to absorb impact energy irreversibly from an excessive load that is caused when the automobile collides with an obstacle. Such a bumper reinforcement typically includes a structure supporting the bumper reinforcement on a front-side member by an impact energy absorbing member. When the vehicle receives an excessive load through the bumper reinforcement, the impact energy absorbing member breaks so as to absorb some of the impact energy.

Figure 11:
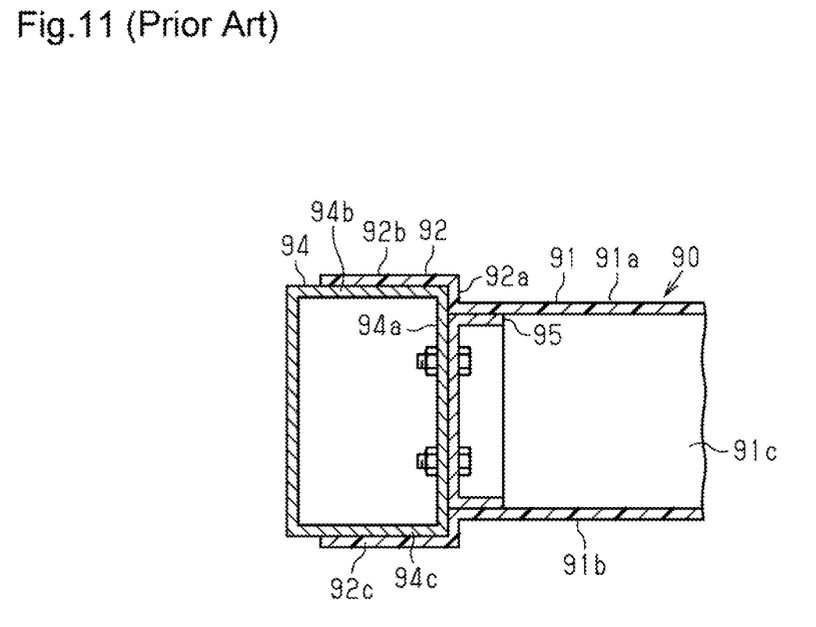
FIG. 11 is a cross-sectional view showing the background art.

Patent Document 1 discloses a typical example of a crash box as such an impact energy absorbing member. As shown in FIG. 11, a crash box 90 disclosed in Patent Document 1 includes an energy absorber 91, a front flange 92 integrated with the energy absorber 91, and a rear flange (not shown). The crash box 90 is made of a fiber-reinforced composite material. The energy absorber 91 has the form of a rectangular tube of which the axial direction is a vehicle front-rear direction, and has a closed cross-sectional shape. The energy absorber 91 includes a top wall 91a, a bottom wall 91b, and left and right side wall 91c. The right side wall 91c connects the right ends of the top wall 91a and the bottom wall 91b in the vehicle width direction. The left side wall 91c connects the left ends of the top wall 91a and the bottom wall 91b in the vehicle width direction. The energy absorber 91 is substantially rectangular in a cross-sectional view seen in a direction that is orthogonal to the axial direction.

The front flange 92 of the crash box 90 includes a front wall 92a, an upper wall 92b, and a lower wall 92c. The front wall 92a juts out vertically and laterally from the front end of the energy absorber 91. The upper wall 92b extends frontward from the upper end of the front wall 92a. The lower wall 92c extends frontward from the lower end of the front wall 92a.

The front wall 92a of the energy absorber 91 and the front end of the energy absorber 91 are in contact with a rear wall 94a of a bumper reinforcement 94. The upper wall 92b of the crash box 90 is joined to an upper wall 94b of the bumper reinforcement 94 through adhesion. The lower wall 92c of the crash box 90 is joined to a lower wall 94c of the bumper reinforcement 94 through adhesion.

Further, the rear wall 94a of the bumper reinforcement 94 includes a limiter member 95 having the form of a rectangular tube. The crash box 90 is fixed to the rear wall 94a of the bumper reinforcement 94 with the limiter member 95 fitted inside the energy absorber 91. The limiter member 95 is configured to limit the displacement of the energy absorber 91 from the bumper reinforcement 94 when the joining of the energy absorber 91 to the bumper reinforcement 94 by the front flange 92 is cancelled, that is, when the energy absorber 91 is separated from the bumper reinforcement 94.

PRIOR ART DOCUMENTS

Patent Documents

Patent Document 1: Japanese Laid-Open Patent Publication No. 2015-196463

SUMMARY OF THE INVENTION

Problems that the Invention is to Solve

In the crash box 90 disclosed in Patent Document 1, during a frontal collision, the joined portion of the crash box 90 and the bumper reinforcement 94 may be collapsed so that the crash box 90 is separated from the bumper reinforcement 94.

It is an object of the present disclosure to provide an impact energy absorbing member capable of absorbing energy in a favorable manner while being fastened to a bumper reinforcement using a fastener.

Means for Solving the Problem

An impact energy absorbing member that achieves the above-described objective is configured to be arranged on a side opposite from a receiving side of a load on a bumper reinforcement extending in a vehicle width direction and configured to be formed by combining a matrix material with a fiber structure. The impact energy absorbing member includes: a tubular energy absorbing portion including an axis that extends in a vehicle front-rear direction, the energy absorbing portion being configured to be collapsed by the load, thereby absorbing impact energy generated when the load is received; and an attachment portion arranged integrally with a side of the energy absorbing portion opposing the bumper reinforcement in an axial direction of the energy absorbing portion. The attachment portion is fastened to the bumper reinforcement using a fastener, the fastener extending through the attachment portion and a wall of the bumper reinforcement and including an axis that extends in a direction intersecting the axial direction of the energy absorbing portion. The attachment portion and the energy absorbing portion are in a positional relationship in which the energy absorbing portion does not overlap the fastener when the impact energy absorbing member is viewed in a direction from the bumper reinforcement toward the energy absorbing portion in the vehicle front-rear direction.

MODES FOR CARRYING OUT THE INVENTION

An impact energy absorbing member included in a vehicle according to an embodiment will now be described with reference to FIGS. 1 to 6. In the following description, the frontward, rearward, leftward, rightward, upward, and downward directions are defined with reference to a state in which the driver of the vehicle faces the forward direction of the vehicle. The left-right direction of the vehicle coincides with the vehicle width direction. Further, the front-rear direction of the vehicle will be referred to the vehicle front-rear direction.

Figure 1:
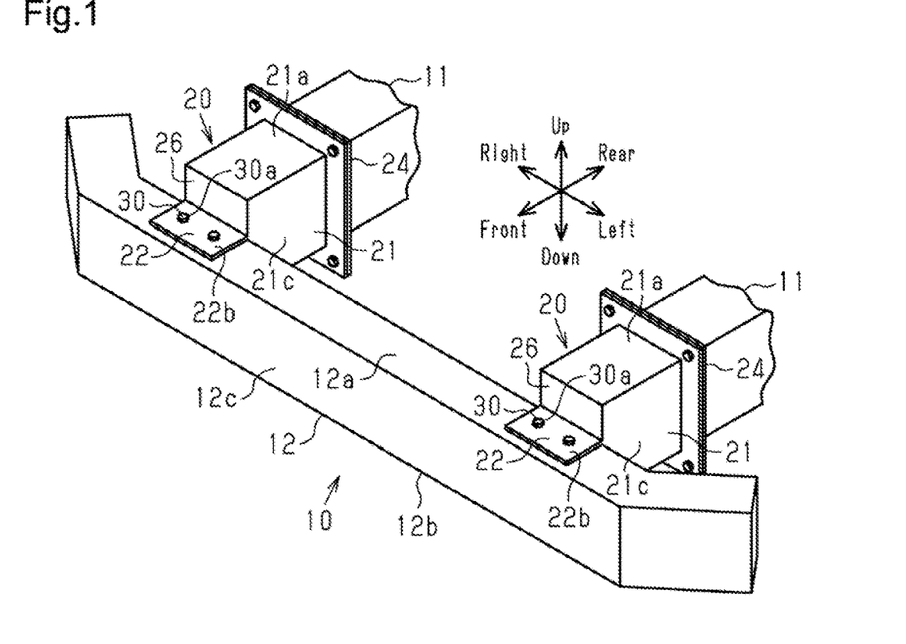
FIG. 1 is a perspective view showing main components of a vehicle body front structure.

As shown in FIG. 1, a vehicle body front structure 10 for an automobile serving as a vehicle includes two front-side members 11 on the opposite sides of the vehicle body front structure 10 in the vehicle width direction. Each front-side member 11 has an elongated shape extending in the vehicle front-rear direction. An impact energy absorbing member 20 is coupled to the front end of each front-side member 11. Further, the vehicle body front structure 10 includes a bumper reinforcement 12 bridging between the front ends of the left and right impact energy absorbing members 20. The bumper reinforcement 12 includes a longitudinal portion extending in the vehicle width direction. In the vehicle body front structure 10, the left and right front-side members 11 are joined to the bumper reinforcement 12 by the impact energy absorbing members 20.

Figure 3:
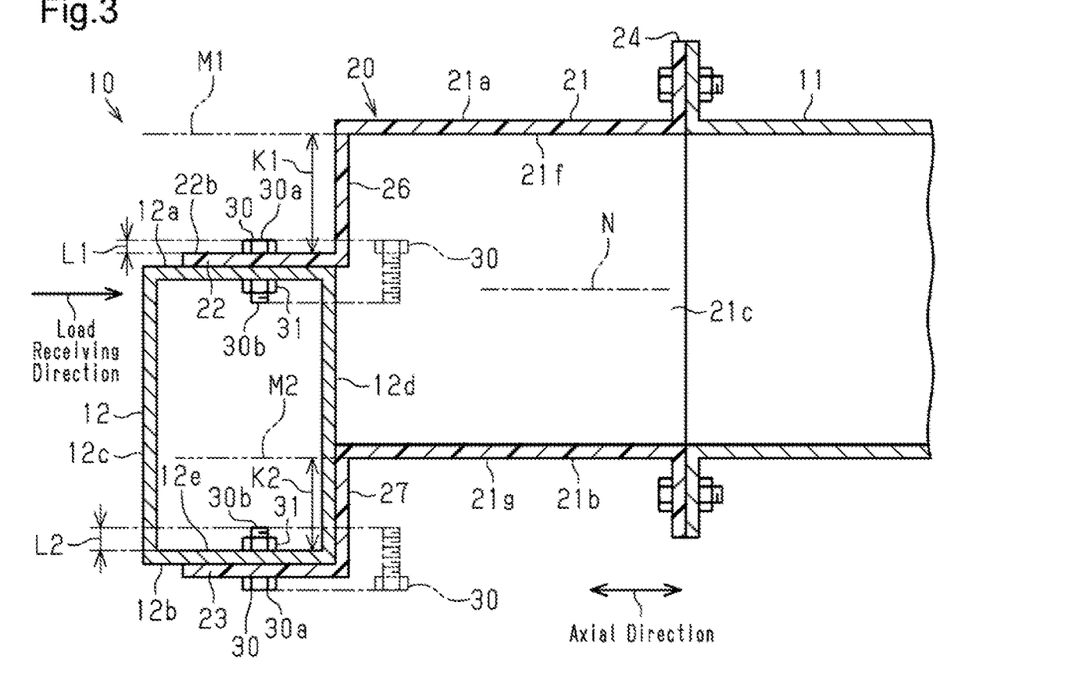
FIG. 3 is a cross-sectional view showing the vehicle body front structure.

As shown in FIG. 3, the bumper reinforcement 12 has a closed cross-section as viewed in the cross-section that is orthogonal to the longitudinal direction. The bumper reinforcement 12 is made of a metal material such as aluminum or a fiber-reinforced composite material such as CFRP. The bumper reinforcement 12 includes an upper wall 12a, a lower wall 12b, a front wall 12c, and a rear wall 12d. The front wall 12c connects the front ends of the upper wall 12a and the lower wall 12b in the vehicle front-rear direction. The rear wall 12d connects the rear ends of the upper wall 12a and the lower wall 12b in the vehicle front-rear direction. The upper wall 12a opposes the lower wall 12b in the up-down direction. The front wall 12c opposes the rear wall 12d in the vehicle front-rear direction.

The impact energy absorbing member 20 will now be described.

The impact energy absorbing member 20 includes an energy absorbing portion 21, an upper attachment portion 22, and a lower attachment portion 23. The upper attachment portion 22 and the lower attachment portion 23, which correspond to attachment portions, are located on the side of the energy absorbing portion 21 opposing the bumper reinforcement 12. The impact energy absorbing member 20 further includes an attachment flange 24 integrated with the rear end of the energy absorbing portion 21. Fastening the attachment flange 24 to the front end of the front-side member 11 joins the impact energy absorbing member 20 to the front-side member 11. The impact energy absorbing member 20 is located on the side opposite from a receiving side of a load on the bumper reinforcement 12.

The impact energy absorbing member 20 is formed by impregnating a fiber structure, which serves as a reinforcing base, with matrix resin. Matrix resin is an example of a matrix material. The matrix material does not have to be matrix resin and may be ceramics. The matrix resin may be, for example, epoxy resin. The fiber structure is manufactured using reinforced fibers. The reinforced fibers may be organic fibers or inorganic fibers. Instead, the reinforced fibers may be different types of organic fibers, different types of inorganic fibers, or mixed fibers in which organic fibers are mixed with inorganic fibers. The organic fibers include, for example, acrylic fibers, nylon fibers, polyester fibers, aramid fibers, poly-p-phenylene benzobisoxazole fibers, and ultra-high molecular weight polyethylene fibers. The inorganic fibers include, for example, carbon fibers, glass fibers, and ceramic fibers. In the present embodiment, the fiber structure is formed using carbon fibers.

Figure 2:
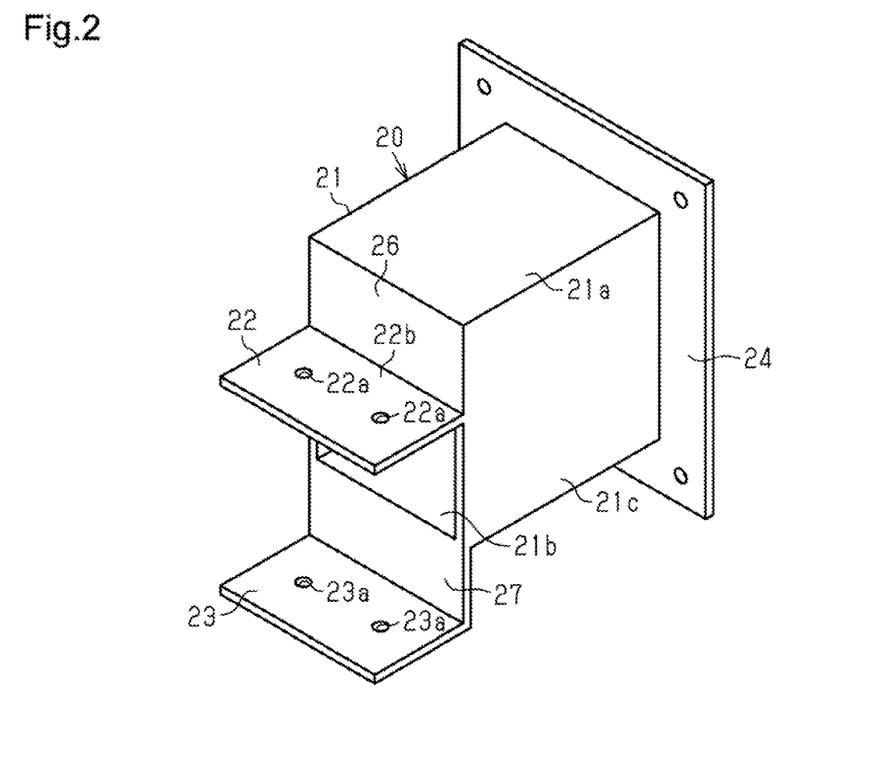
FIG. 2 is a perspective view showing the impact energy absorbing member.

As shown in FIGS. 2 and 3, the energy absorbing portion 21 has the form of a rectangular tube including axis N that extends in the vehicle front-rear direction. In the following description, the direction in which axis N extends is defined as the axial direction of the energy absorbing portion 21. The energy absorbing portion 21 has a closed cross-sectional structure. The energy absorbing portion 21 includes a top plate 21a, a bottom plate 21b, and right and left side plates 21c. The top plate 21a and the bottom plate 21b oppose each other in the up-down direction. The right side plate 21c connects the right ends of the top plate 21a and the bottom plate 21b in the vehicle width direction. The left side plate 21c connects the left ends of the top plate 21a and the bottom plate 21b in the vehicle width direction. In the impact energy absorbing member 20, the energy absorbing portion 21 includes a longitudinal part extending in the axial direction. Further, the energy absorbing portion 21 includes the top plate 21a, the bottom plate 21b, and the two side plates 21c. The energy absorbing portion 21 is collapsed by a load caused by a collision, thereby absorbing impact energy generated when the load is received.

The impact energy absorbing member 20 includes an upper coupling portion 26. The upper coupling portion 26 is a coupling portion of the energy absorbing portion 21 and the upper attachment portion 22. The upper coupling portion 26 extends downward from the front end of the top plate 21a adjacent to the bumper reinforcement 12. The upper coupling portion 26 is arranged so as to connect the front ends of the two side plates 21c adjacent to the top plate 21a.

The upper attachment portion 22 extends from the lower end of the upper coupling portion 26 toward the bumper reinforcement 12 in the axial direction of the energy absorbing portion 21. That is, the upper attachment portion 22 extends frontward from the lower end of the upper coupling portion 26. The upper attachment portion 22 is rectangular. The upper attachment portion 22 includes two through-holes 22a. The two through-holes 22a are located inward from the opposite ends of the upper attachment portion 22 in the vehicle width direction. The upper attachment portion 22 is located downward from the top plate 21a of the energy absorbing portion 21.

The upper attachment portion 22 is fastened to the upper wall 12a of the bumper reinforcement 12. Shaft portions 30b of bolts 30 extending through the through-holes 22a of the upper attachment portion 22 extend through the upper wall 12a of the bumper reinforcement 12 and are fastened to nuts 31 inside the bumper reinforcement 12. Thus, the axes of the shaft portions 30b of the bolts 30 extend in a direction that is orthogonal to the axial direction of the energy absorbing portion 21. The bolts 30 and the nuts 31 serve as fasteners used to fasten the upper attachment portion 22 to the bumper reinforcement 12.

The surface that passes through an inner surface 21f of the top plate 21a and extends in the axial direction of the energy absorbing portion 21 is defined as an upper imaginary plane M1. The distance from an upper surface 22b of the upper attachment portion 22 to the upper imaginary plane M1 in the up-down direction is defined as an upper separation distance K1. Further, the distance from the upper surface 22b of the upper attachment portion 22 to a head 30a of each bolt 30 in the up-down direction is defined as an upper protrusion length L1. The upper separation distance K1 is longer than the upper protrusion length L1. The top plate 21a is located upward from the head 30a of the bolt 30. Thus, the top plate 21a is located upward from the head 30a of the bolt 30 by adjusting the dimension of the upper coupling portion 26 in the up-down direction.

The impact energy absorbing member 20 includes a lower coupling portion 27. The lower coupling portion 27 is a coupling portion of the energy absorbing portion 21 and the lower attachment portion 23. The lower coupling portion 27 extends downward from the front end of the bottom plate 21b adjacent to the bumper reinforcement 12. The lower attachment portion 23 extends from the lower end of the lower coupling portion 27 toward the bumper reinforcement 12 in the axial direction of the energy absorbing portion 21. That is, the lower attachment portion 23 extends frontward from the lower end of the lower coupling portion 27. The lower attachment portion 23 is rectangular. The lower attachment portion 23 includes two through-holes 23a. The lower attachment portion 23 is located downward from the bottom plate 21b of the energy absorbing portion 21.

The lower attachment portion 23 is fastened to the lower wall 12b of the bumper reinforcement 12. Shaft portions 30b of bolts 30 extending through the through-holes 23a of the lower attachment portion 23 extend through the lower wall 12b of the bumper reinforcement 12 and are fastened to nuts 31 inside the bumper reinforcement 12. Thus, the axes of the shaft portions 30b of the bolts 30 extend in a direction that is orthogonal to the axial direction of the energy absorbing portion 21. The bolts 30 and the nuts 31 serve as fasteners used to fasten the lower attachment portion 23 to the bumper reinforcement 12.

The surface that passes through an outer surface 21g of the bottom plate 21b and extends in the axial direction of the energy absorbing portion 21 is defined as a lower imaginary plane M2. The distance from an upper surface 12e of the lower wall 12b to the lower imaginary plane M2 in the up-down direction is defined as a lower separation distance K2. Further, the distance from the upper surface 12e of the lower wall 12b to the shaft portion 30b of each bolt 30 in the up-down direction is defined as a lower protrusion length L2. The lower separation distance K2 is longer than the lower protrusion length L2. The bottom plate 21b is located upward from the shaft portion 30b of the bolt 30. Thus, the bottom plate 21b is located upward from the shaft portion 30b of the bolt 30 by adjusting the dimension of the lower coupling portion 27 in the up-down direction.

Figure 4:
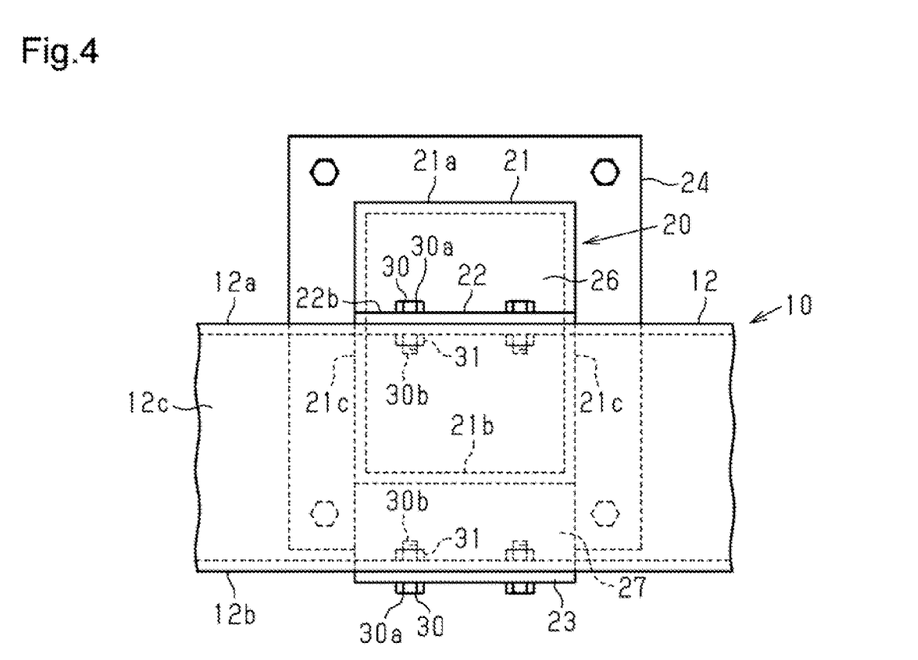
FIG. 4 is a diagram showing the impact energy absorbing member as viewed in a direction from the bumper reinforcement toward the impact energy absorbing member.

As shown in FIG. 4, when the impact energy absorbing member 20 is viewed in a direction from the bumper reinforcement 12 toward the impact energy absorbing member 20 in the vehicle front-rear direction, the upper attachment portion 22, the lower attachment portion 23, and the energy absorbing portion 21 are in a positional relationship in which the energy absorbing portion 21 does not overlap the bolts 30. In the present embodiment, the positions of the upper attachment portion 22 and the energy absorbing portion 21 and the positions of the through-holes 22a are set such that the bolts 30 fastening the upper attachment portion 22 are located downward from the top plate 21a and inward from the two side plates 21c.

Likewise, the positions of the lower attachment portion 23 and the energy absorbing portion 21 are set such that the bolts 30 fastening the lower attachment portion 23 are located downward from the bottom plate 21b. In other words, as shown by the long dashed double-short dashed line in FIG. 3, the positions of the top plate 21a, the bottom plate 21b, and the side plates 21c of the energy absorbing portion 21 are set such that the energy absorbing portion 21 does not contact the bolts 30 fastening the upper attachment portion 22 and the lower attachment portion 23 if the bolts 30 were hypothetically moved in the load receiving direction.

The operation of the impact energy absorbing member 20 will now be described.

When a frontal collision occurs in an automobile in which the vehicle body front structure 10 is employed, the impact energy absorbing member 20 receives a load from the bumper reinforcement 12. In the case of a frontal collision, the load receiving direction is oriented from the front toward the rear in the vehicle front-rear direction. The load compresses and deforms (breaks) the bumper reinforcement 12 and the energy absorbing portion 21 from the front. The compression and deformation cause some of the collision energy to be absorbed.

The joining strength of the typical crash box 90 described in the background art section may be increased by fastening the upper wall 92b and the lower wall 92c of the crash box 90 to the upper wall 94b and the lower wall 94c of the bumper reinforcement using bolts and nuts. However, in such a structure, when the bumper reinforcement 94 is deformed toward the energy absorber 91 during a frontal collision, the bolts may collide with the top wall 91a and the bottom wall 91b of the energy absorber 91 so as to crack the top wall 91a and the bottom wall 91b. As a result, the energy may not be able to be absorbed by the collapse of the energy absorber 91.

Figure 6:
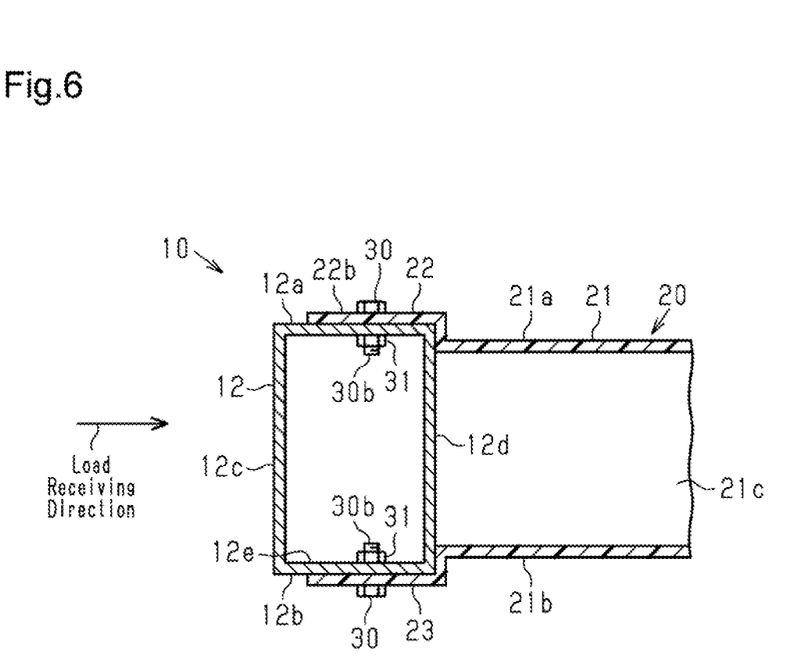
FIG. 6 is a diagram showing a comparative example.

FIG. 6 is a comparative example in which the shaft portions 30b of the bolts 30 overlap the energy absorbing portion 21 when the impact energy absorbing member 20 is viewed in the direction from the bumper reinforcement 12 toward the impact energy absorbing member 20 in the vehicle front-rear direction. In this example, when a frontal collision occurs, the bolts 30 moving downstream in the receiving direction may contact the top plate 21a and the bottom plate 21b of the energy absorbing portion 21.

Figure 5:
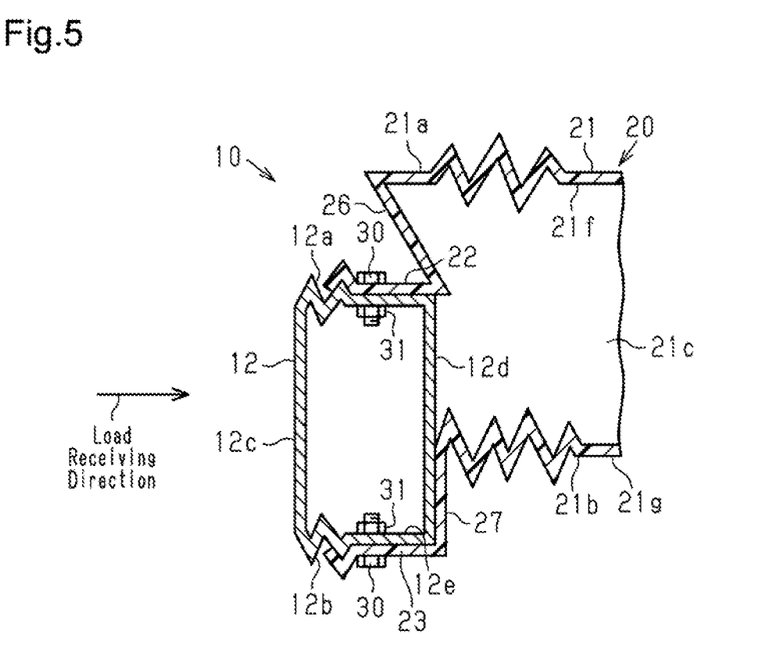
FIG. 5 is a diagram illustrating the operation of the impact energy absorbing member.

However, in the present embodiment, as shown in FIG. 5, the bolts 30 do not overlap the energy absorbing portion 21 when the impact energy absorbing member 20 is viewed in the direction from the bumper reinforcement 12 toward the impact energy absorbing member 20 in the vehicle front-rear direction (i.e., when the impact energy absorbing member 20 is viewed from the upstream side in the load receiving direction). Thus, when the top plate 21a, the bottom plate 21b, and the side plates 21c are compressed and deformed and the bolts 30 are moved toward the energy absorbing portion 21, the bolts 30 avoid colliding with the top plate 21a, the bottom plate 21b, and the side plates 21c of the energy absorbing portion 21. Accordingly, the top plate 21a, the bottom plate 21b, and the side plates 21c are broken when receiving the load.

The above-described embodiment has the following advantages.

(1) In the impact energy absorbing member 20, when the impact energy absorbing member 20 is viewed in the direction from the bumper reinforcement 12 toward the impact energy absorbing member 20 in the vehicle front-rear direction, the upper attachment portion 22, the lower attachment portion 23, and the energy absorbing portion 21 are in the positional relationship in which the bolts 30 do not overlap the energy absorbing portion 21. Thus, when a frontal collision occurs, the energy absorbing portion 21 is not located at positions to which the bolts 30 have moved. This allows the bolts 30 to avoid colliding with the energy absorbing portion 21. As a result, the energy absorbing portion 21 is broken when receiving a load, thereby absorbing the collision energy in a favorable manner.

(2) The upper attachment portion 22 is fastened to the upper wall 12a of the bumper reinforcement 12 using the bolts 30 and the nuts 31. The lower attachment portion 23 is fastened to the lower wall 12b of the bumper reinforcement 12 using the bolts 30 and the nuts 31. Thus, during a small overlap frontal collision or oblique collision, the bumper reinforcement 12 is permitted to pivot about the fastened portions of the upper attachment portion 22 and the lower attachment portion 23. This limits the bending of the impact energy absorbing member 20 and limits a decrease in the energy absorption efficiency of the impact energy absorbing member 20.

(3) The energy absorbing portion 21 has a closed cross-sectional structure and has no joint around the axis of the energy absorbing portion 21. Thus, the joint of the energy absorbing portion 21 is prevented from cracking when the energy absorbing portion 21 receives an impact load. This eliminates a decrease in the energy absorption efficiency caused by the cracking of the energy absorption efficiency.

(4) The top plate 21a of the energy absorbing portion 21 is located upward from the upper attachment portion 22 and upward from the upper wall 12a of the bumper reinforcement 12. This allows components located upward from the bumper reinforcement 12 to easily collide with the top plate 21a during a frontal collision so that the impact energy caused by the collision is absorbed by the top plate 21a.

(5) The bottom plate 21b of the energy absorbing portion 21 is located upward from the lower attachment portion 23 and upward from the lower wall 12b of the bumper reinforcement 12. That is, the bottom plate 21b overlaps the bumper reinforcement 12 in the axial direction of the energy absorbing portion 21. This ensures the arrangement space for vehicle components below the energy absorbing portion 21.

The present embodiment may be modified as follows. The present embodiment and the following modifications can be combined as long as they remain technically consistent with each other.

Figure 7:
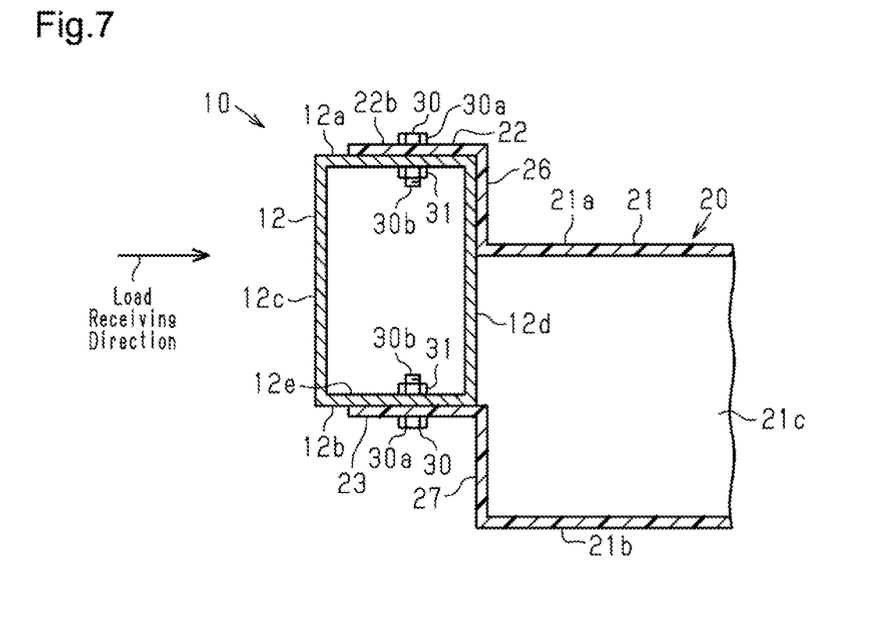
FIG. 7 is a cross-sectional view showing the impact energy absorbing member according to a modification.

As shown in FIG. 7, in the impact energy absorbing member 20, the upper coupling portion 26 may extend upward from the front end of the top plate 21a of the energy absorbing portion 21 and the upper attachment portion 22 may extend frontward from the upper end of the upper coupling portion 26. Further, in the impact energy absorbing member 20, the lower coupling portion 27 may extend upward from the front end of the bottom plate 21b of the energy absorbing portion 21 and the lower attachment portion 23 may extend frontward from the upper end of the lower coupling portion 27. The upper attachment portion 22 is fastened to the upper wall 12a. The lower attachment portion 23 is fastened to the lower wall 12b. The upper attachment portion 22 is located upward from the top plate 21a, and the lower attachment portion 23 is located upward from the bottom plate 21b.

Figure 8:
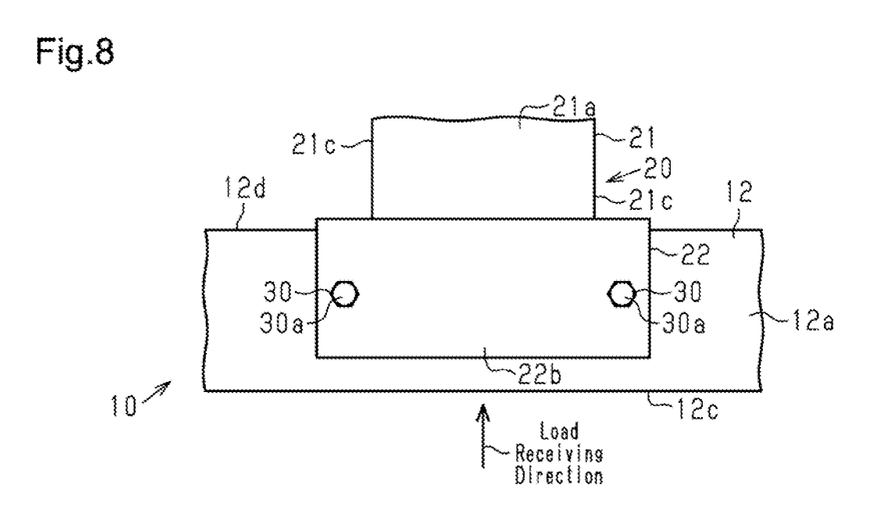
FIG. 8 is a plan view showing the impact energy absorbing member according to another modification.

As shown in FIG. 8, the upper attachment portion 22 and the lower attachment portion 23 may be extended in the vehicle width direction such that the opposite ends of the upper attachment portion 22 and the lower attachment portion 23 in the vehicle width direction are located outward from the energy absorbing portion 21 in the vehicle width direction. The through-holes 22a, 23a are located so as not to overlap the side plates 21c in the axial direction of the energy absorbing portion 21, respectively. The side plates 21c of the energy absorbing portion 21 are located so as not to overlap the bolts 30 when the impact energy absorbing member 20 is viewed in the direction from the bumper reinforcement 12 toward the energy absorbing portion 21 in the vehicle front-rear direction.

Figure 9:
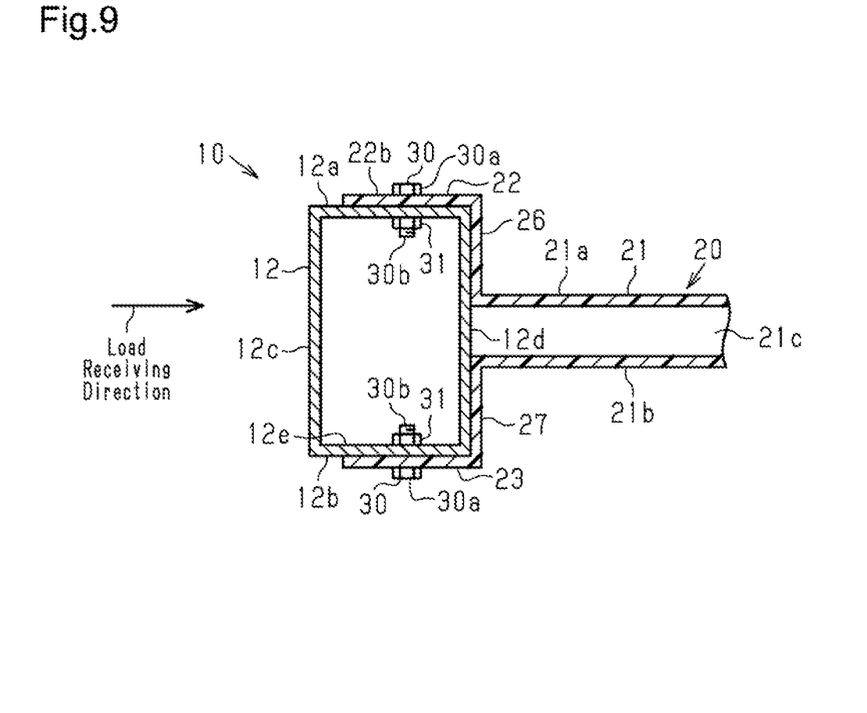
FIG. 9 is a cross-sectional view showing the impact energy absorbing member according to a further modification.

As shown in FIG. 9, in the impact energy absorbing member 20, the upper coupling portion 26 may extend upward from the front end of the top plate 21a of the energy absorbing portion 21 and the upper attachment portion 22 may extend frontward from the upper end of the upper coupling portion 26. Further, in the impact energy absorbing member 20, the lower coupling portion 27 may extend downward from the front end of the bottom plate 21b of the energy absorbing portion 21 and the lower attachment portion 23 may extend frontward from the lower end of the lower coupling portion 27. The upper attachment portion 22 is fastened to the upper wall 12a. The lower attachment portion 23 is fastened to the lower wall 12b. In this case, the upper attachment portion 22 is located upward from the top plate 21a, and the lower attachment portion 23 is located downward from the bottom plate 21b.

Figure 10:
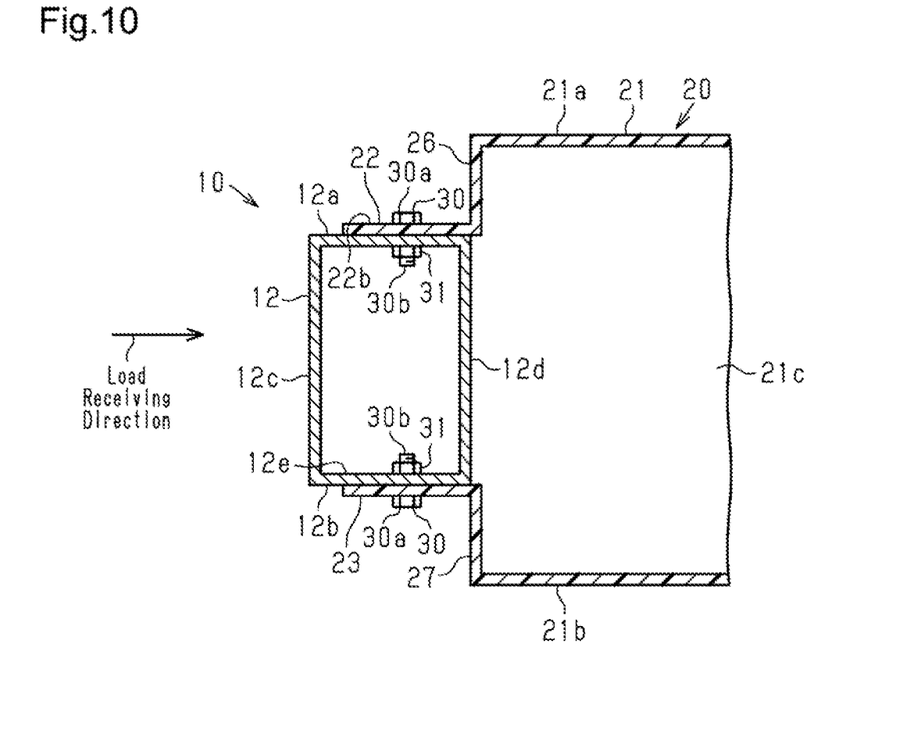
FIG. 10 is a cross-sectional view showing the impact energy absorbing member according to yet another modification.

As shown in FIG. 10, in the impact energy absorbing member 20, the upper coupling portion 26 may extend downward from the front end of the top plate 21a of the energy absorbing portion 21 and the upper attachment portion 22 may extend frontward from the lower end of the upper coupling portion 26. Further, in the impact energy absorbing member 20, the lower coupling portion 27 may extend upward from the front end of the bottom plate 21b of the energy absorbing portion 21 and the lower attachment portion 23 may extend frontward from the upper end of the lower coupling portion 27. The upper attachment portion 22 is fastened to the upper wall 12a. The lower attachment portion 23 is fastened to the lower wall 12b. In this case, the upper attachment portion 22 is located downward from the top plate 21a, and the lower attachment portion 23 is located upward from the bottom plate 21b.

The impact energy absorbing member 20 may include a coupling portion that extends from the front end of the side plate 21c closer to one end in the vehicle width direction to the end in the vehicle width direction, and may include an attachment portion that extends frontward from the extended end of the coupling portion. The attachment portion is fastened to the end of the bumper reinforcement 12 in the vehicle width direction using the bolts 30 and the nuts 31. In this case, the axes of the shaft portions 30b of the bolts 30 extend in the vehicle width direction and intersect the axial direction of the energy absorbing portion 21. The side plates 21c of the energy absorbing portion 21 are located so as not to overlap the bolts 30 fastened to the attachment portion when the impact energy absorbing member 20 is viewed in the direction from the bumper reinforcement 12 toward the energy absorbing portion 21 in the vehicle front-rear direction. The other side plate 21c of the energy absorbing portion 21 includes a front plate that extends inward from the front end in the vehicle width direction, and the front plate is fastened to the rear wall 12d of the bumper reinforcement 12 using the bolts 30 and the nuts 31.

The impact energy absorbing members 20 do not have to be arranged on the opposite sides in the vehicle width direction. Instead, only one impact energy absorbing member 20 may be arranged on a middle portion of the impact energy absorbing member 20 in the vehicle width direction. Alternatively, the impact energy absorbing members 20 may be arranged at positions other than the opposite sides in the vehicle width direction.

The shape of the energy absorbing portion 21 is not limited to a rectangular tube and may be a pentagonal tube, a hexagonal tube, or an octagonal tube.

The impact energy absorbing member 20 may be arranged between the bumper reinforcement and the rear-side member in a vehicle body rear structure.

The vehicle is not limited to an automobile and may be, for example, an industrial vehicle.

The load receiving direction is not limited to the front-rear direction and may be oblique during, for example, an oblique collision. Even in this case, the bolts 30 and the energy absorbing portion 21 are in a positional relationship in which they do not overlap each other. Thus, the energy absorbing portion 21 is not located at positions to which the bolts 30 have moved. This allows the bolts 30 to avoid colliding with the energy absorbing portion 21. As a result, the energy absorbing portion 21 is broken when receiving a load, thereby absorbing the collision energy in a favorable manner.

The invention claimed is:

1. An impact energy absorbing member configured to be arranged on a side opposite from a receiving side of a load on a bumper reinforcement extending in a vehicle width direction and configured to be formed by combining a matrix material with a fiber structure, the impact energy absorbing member comprising:
    a tubular energy absorbing portion including an axis that extends in a vehicle front-rear direction, the energy absorbing portion being configured to be collapsed by the load, thereby absorbing impact energy generated when the load is received; and
    an attachment portion arranged integrally with a side of the energy absorbing portion opposing the bumper reinforcement in an axial direction of the energy absorbing portion, wherein
    the attachment portion is fastened to the bumper reinforcement using a fastener, the fastener extending through the attachment portion and a wall of the bumper reinforcement and including an axis that extends in a direction intersecting the axial direction of the energy absorbing portion, and
    the attachment portion and the energy absorbing portion are in a positional relationship in which the energy absorbing portion does not overlap the fastener when the impact energy absorbing member is viewed in a direction from the bumper reinforcement toward the energy absorbing portion in the vehicle front-rear direction,
    wherein the wall includes an upper wall and a lower wall,
    wherein the attachment portion includes an upper attachment portion fastened to the upper wall of the bumper reinforcement and a lower attachment portion fastened to the lower wall of the bumper reinforcement,
    wherein the upper attachment portion is fastened to the bumper reinforcement using the fastener extending through the upper attachment portion and the upper wall in an up-down direction,
    wherein the lower attachment portion is fastened to the bumper reinforcement using the fastener extending through the lower attachment portion and the lower wall in the up-down direction,
    wherein the energy absorbing portion includes a top plate and a bottom plate opposing each other in the up-down direction,
    wherein the upper attachment portion extends toward the bumper reinforcement, in the axial direction of the energy absorbing portion, from a lower end of an upper coupling portion, the upper coupling portion extending downward from an end of the top plate of the energy absorbing portion adjacent to the bumper reinforcement, and
    wherein the lower attachment portion extends toward the bumper reinforcement, in the axial direction of the energy absorbing portion, from a lower end of a lower coupling portion, the lower coupling portion extending downward from an end of the bottom plate of the energy absorbing portion adjacent to the bumper reinforcement.

2. The impact energy absorbing member of claim 1, wherein the energy absorbing portion further comprises two side plates having front ends in the axial direction of the energy absorbing portion, and
    wherein the upper coupling portion connects the front ends of the two side plates adjacent to the top plate of the energy absorbing portion.

* * * * *